(12) United States Patent
Takemoto et al.

(10) Patent No.: US 12,337,775 B2
(45) Date of Patent: Jun. 24, 2025

(54) BATTERY UNIT ARRANGEMENT STRUCTURE FOR VEHICLE

(71) Applicant: MAZDA MOTOR CORPORATION, Hiroshima (JP)

(72) Inventors: Yuya Takemoto, Hiroshima (JP); Mayumi Funada, Hiroshima (JP); Masanao Sato, Hiroshima (JP); Tadashi Okihara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 510 days.

(21) Appl. No.: 17/869,221

(22) Filed: Jul. 20, 2022

(65) Prior Publication Data

US 2023/0030846 A1  Feb. 2, 2023

(30) Foreign Application Priority Data

Jul. 27, 2021 (JP) .................................. 2021-122380

(51) Int. Cl.
  *B62D 25/20*  (2006.01)
  *B60K 1/04*  (2019.01)
  *B60R 16/04*  (2006.01)

(52) U.S. Cl.
  CPC .......... *B60R 16/04* (2013.01); *B62D 25/2045* (2013.01); *B60K 2001/0411* (2013.01)

(58) Field of Classification Search
  CPC .................... B60K 2001/0411; B62D 25/2045
  See application file for complete search history.

(56) References Cited

U.S. PATENT DOCUMENTS

| | | | | |
|---|---|---|---|---|
| 8,479,858 B2* | 7/2013 | Kodaira | ................. | B62D 21/17 180/68.5 |
| 8,657,365 B2* | 2/2014 | Amano | ................. | B62D 21/152 296/187.11 |
| 9,649,923 B2* | 5/2017 | Perlo | ........................ | B60K 1/04 |

(Continued)

FOREIGN PATENT DOCUMENTS

| | | | | |
|---|---|---|---|---|
| CN | | 110293832 A | * 10/2019 | ............... B60K 1/04 |
| DE | 10 2017 106 190 A1 | | 9/2017 | |

(Continued)

OTHER PUBLICATIONS

Translation of CN-110293832-A (Year: 2019).*

*Primary Examiner* — Katy M Ebner
(74) *Attorney, Agent, or Firm* — Studebaker Brackett PLLC

(57) ABSTRACT

A battery unit arrangement structure for a vehicle increases legroom for a passenger while disposing a battery in front of the passenger seat. The structure includes a dash vertical wall separating an interior from an engine compartment, a floor panel of the interior, and a curved corner portion connecting the lower end of the dash vertical wall and the front end of the floor panel together. The battery unit is mounted on the corner portion in front of the passenger seat with the upper surface of the battery unit inclined downward toward the vehicle rear so the rear end of the battery unit is lower than the front end of the battery unit. The battery unit is covered from above with a cover member inclined downward toward the vehicle rear so the rear end of the cover member is lower than the front end of the cover member.

20 Claims, 13 Drawing Sheets

(56) References Cited

U.S. PATENT DOCUMENTS

| | | | | |
|---|---|---|---|---|
| 9,789,755 B2* | 10/2017 | Aishima | | H01M 8/2475 |
| 9,895,999 B2* | 2/2018 | Ohashi | | B60K 1/04 |
| 10,322,647 B2* | 6/2019 | Naito | | H01M 8/04089 |
| 10,625,784 B2* | 4/2020 | Stenvall | | B62D 21/152 |
| 10,654,367 B2* | 5/2020 | Ichida | | B60L 50/71 |
| 11,260,760 B2* | 3/2022 | Akiyama | | H01M 8/2475 |
| 2017/0088182 A1* | 3/2017 | Hara | | B62D 25/2072 |
| 2018/0029459 A1* | 2/2018 | Okada | | B60K 6/28 |
| 2018/0304767 A1* | 10/2018 | Ichida | | B60L 3/0007 |
| 2020/0212519 A1* | 7/2020 | Katayama | | H01M 10/613 |
| 2021/0284031 A1* | 9/2021 | Yamada | | B60L 50/64 |
| 2022/0314774 A1* | 10/2022 | Toda | | B62D 25/20 |
| 2022/0402553 A1* | 12/2022 | Hara | | B60K 1/04 |
| 2023/0339552 A1* | 10/2023 | Jeong | | B62D 27/065 |
| 2024/0217583 A1* | 7/2024 | Jeong | | B60L 50/66 |
| 2024/0375715 A1* | 11/2024 | Kum | | B62D 25/04 |

FOREIGN PATENT DOCUMENTS

| | | |
|---|---|---|
| JP | 2011-088503 A | 5/2011 |
| JP | 2020-104532 A | 7/2020 |

* cited by examiner

BATTERY UNIT ARRANGEMENT STRUCTURE FOR VEHICLE

TECHNICAL FIELD

The present disclosure relates to a battery unit arrangement structure for a vehicle.

BACKGROUND ART

Japanese Patent Document JP-A-2011-88503 describes that a storage space is provided below an instrument panel in front of the passenger seat of a vehicle and an in-vehicle battery and an in-vehicle device are disposed in this storage space. This in-vehicle battery is held by the battery tray and disposed in the storage space. This battery tray has a recess in which the lower end portion of the in-vehicle battery is held and a rear wall plate provided in the rear end portion of the recess. Accordingly, the storage space is separated from the legroom for the occupant of the passenger seat by this vertical wall portion.

SUMMARY OF THE DISCLOSURE

To obtain the legroom for the occupant of the passenger seat, the in-vehicle battery below the instrument panel is preferably disposed as forward as possible. However, when the in-vehicle battery is disposed on the floor panel as in JP-A-2011-88503, the legroom for the occupant of the passenger seat becomes narrower because the allowable position of the in-vehicle battery is limited, so there is concern that this occupant may have a cramped feeling.

Accordingly, the present disclosure provides a structure in which the battery unit is disposed in front of the passenger seat and legroom for the occupant of the passenger seat can be obtained.

To achieve this goal, the present disclosure provides a curved corner portion that connects a dash panel vertical wall portion and a floor panel to each other and disposes a battery unit on this corner portion so that the upper surface of the battery unit is inclined downward toward the vehicle rear.

Specifically, a battery unit arrangement structure for a vehicle disclosed herein includes a dash panel vertical wall portion that separates a vehicle interior from an engine compartment; a floor panel that forms a floor surface of the vehicle interior; and a curved corner portion that connects a lower end of the dash panel vertical wall portion and a front end of the floor panel to each other, in which the battery unit is mounted on the corner portion in front of a passenger seat with an upper surface of the battery unit inclined downward toward a vehicle rear so that a rear end of the battery unit is lower than a front end of the battery unit, and the battery unit is covered, from above, with a cover member that is inclined downward toward the vehicle rear so that a rear end of the cover member is lower than a front end of the cover member.

In the battery unit arrangement structure, the battery unit is disposed so that the upper surface is inclined downward toward the vehicle rear using the curved shape of the corner portion. Therefore, as compared with the case in which the upper surface of the battery unit is disposed horizontally, the battery unit can be disposed closer to the dash panel vertical wall portion. Accordingly, the legroom for the occupant of the passenger seat can be enlarged. In addition, the top of the cover member, which is inclined downward toward the vehicle rear, can be used as the footrest for the occupant of the passenger seat. Accordingly, the interior comfort is improved and the oppressive feeling of the occupant sitting on the passenger seat can be reduced.

According to an embodiment of the disclosure, there is a clearance between the battery unit and the dash panel vertical wall portion.

In this embodiment, the dash panel vertical wall portion can be prevented from making contact with the battery unit when the dash panel vertical wall portion moves to the rear side due to a front collision of the vehicle. Accordingly, the impact on the battery unit due to a front collision of the vehicle can be mitigated.

Furthermore, since the battery unit is disposed so that the upper surface is inclined downward toward the vehicle rear using the curved shape of the corner portion, even when the battery unit is disposed closer to the front, a clearance can be obtained between the upper portion of the battery unit and the dash panel vertical wall portion.

According to one embodiment, the battery unit includes a mounting bracket fixed to the corner portion, a battery placed on the mounting bracket, and a battery clamp that passes over the battery and is fastened to a fastening portion of the mounting bracket, the fastening portion extending to an outer side from the battery, and the mounting bracket has a cover member fixing portion that fixes an edge of the cover member.

In this embodiment, the cover member can be fixed to the vehicle body side without extending the fixing edge of the cover member to the outer side of the mounting bracket, thereby advantageously making the cover member compact.

According to one embodiment, the cover member fixing portion is disposed adjacent to a fixing portion through which the mounting bracket is fixed to the corner portion.

When the support rigidity for the cover member is low, the occupant may have an uncomfortable feeling when putting the legs on the top of the cover member. According to this embodiment, the support rigidity for the cover member can be improved and the uncomfortable feeling of the occupant can be reduced.

According to one embodiment, an in-vehicle device to which electric power is supplied from the battery unit is provided adjacent in a vehicle width direction to the battery unit, and the battery unit and the in-vehicle device are covered with the cover member from above.

In this embodiment, the battery unit and the in-vehicle device can be efficiently disposed together by using the space of the corner portion that is large in the vehicle width direction. In addition, the harness for supplying electric power to the in-vehicle device can be shortened, thereby making the electrical connection compact.

According to one embodiment, a main battery is disposed in the engine compartment, and the battery unit is a unit of a sub battery having a smaller capacity than the main battery.

According to the present disclosure, since the battery unit is disposed on the corner portion so that the upper surface thereof is inclined toward the vehicle rear, the legroom for the occupant of the passenger seat can be obtained while the battery unit is disposed in front of the passenger seat.

DETAILED DESCRIPTION

An embodiment of the present disclosure will be described in detail below with reference to the drawings. The following description of an embodiment is only an example essentially and is not intended to limit the present disclosure, applications thereof, or use thereof at all.

Lower Structure in Front of Passenger Seat

Figure 1:
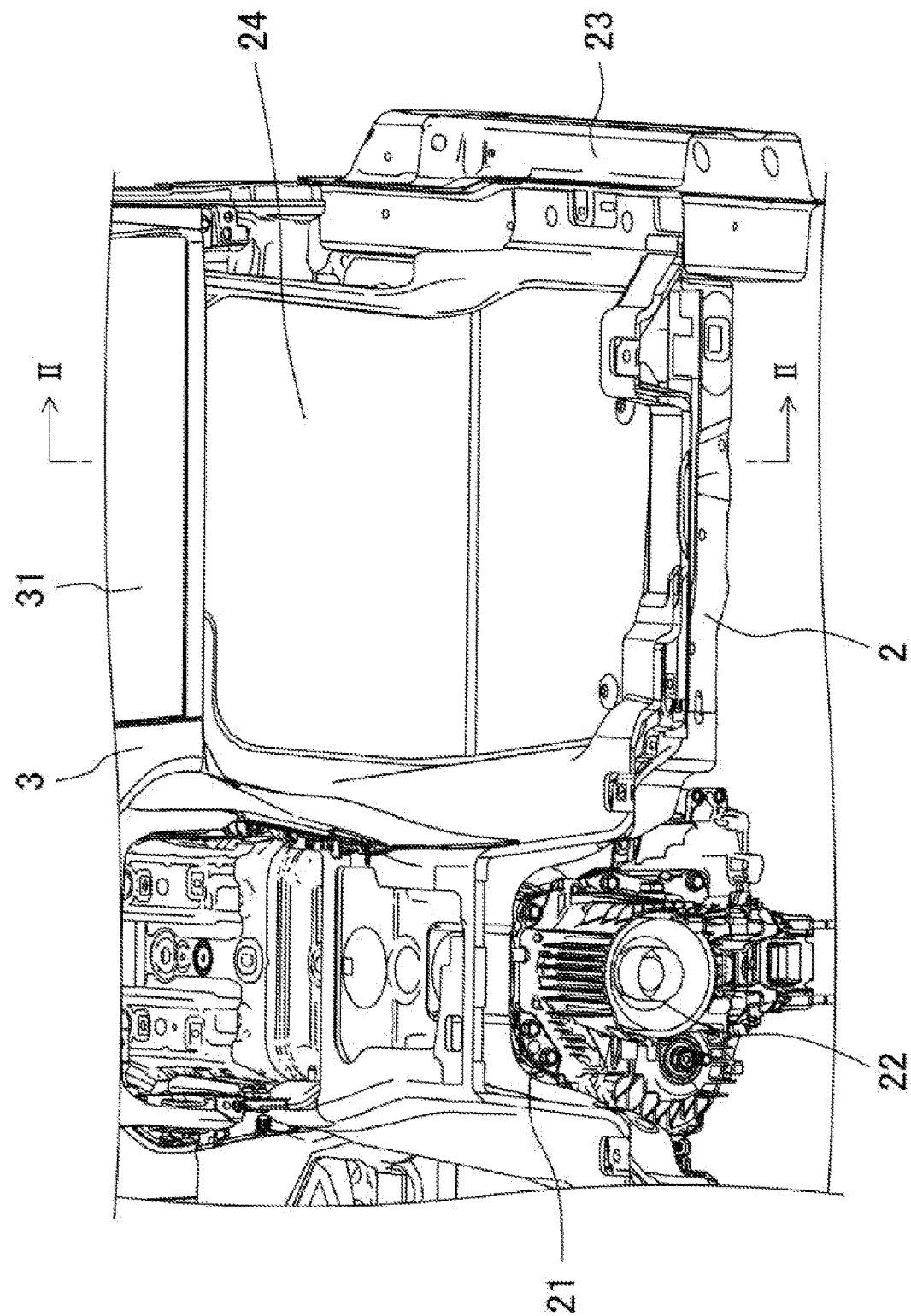
FIG. 1 is a rear view illustrating a portion of a vehicle in front of a passenger seat.

FIG. 1 illustrates the portion of a vehicle in front of the passenger seat. A floor panel 2 forming a floor surface that spreads substantially horizontally is provided in the lower portion (lower side in FIG. 1) of a vehicle interior 1 of this vehicle. In the middle (left side in FIG. 1) in the vehicle width direction of this floor panel 2, a tunnel portion 21 recessed upward (upper side in FIG. 1) is provided so as to extend in the longitudinal direction. A propeller shaft 22 that extends in the longitudinal direction is provided in the tunnel portion 21. A side sill 23 that extends in the longitudinal direction is provided on the outer side (right side in FIG. 1) in the vehicle width direction of the floor panel 2. This side sill 23 is formed by welding a side sill inner panel with a hat-shaped cross section that opens to the outer side in the vehicle width direction and a side sill outer panel with a hat-shaped cross section that opens to the inner side in the vehicle width direction while sandwiching a side sill reinforcement between the flanges provided above and below the side sill inner panel and the side sill outer panel.

As illustrated in FIG. 1, an instrument panel 3 that extends in the vehicle width direction is provided in front of the passenger seat. A glove box 31 for the passenger seat is assembled to this instrument panel 3. The space below this glove box 31 is the legroom for the occupant of the passenger seat. A floor mat 24 is provided in this legroom for the occupant.

Figure 2:
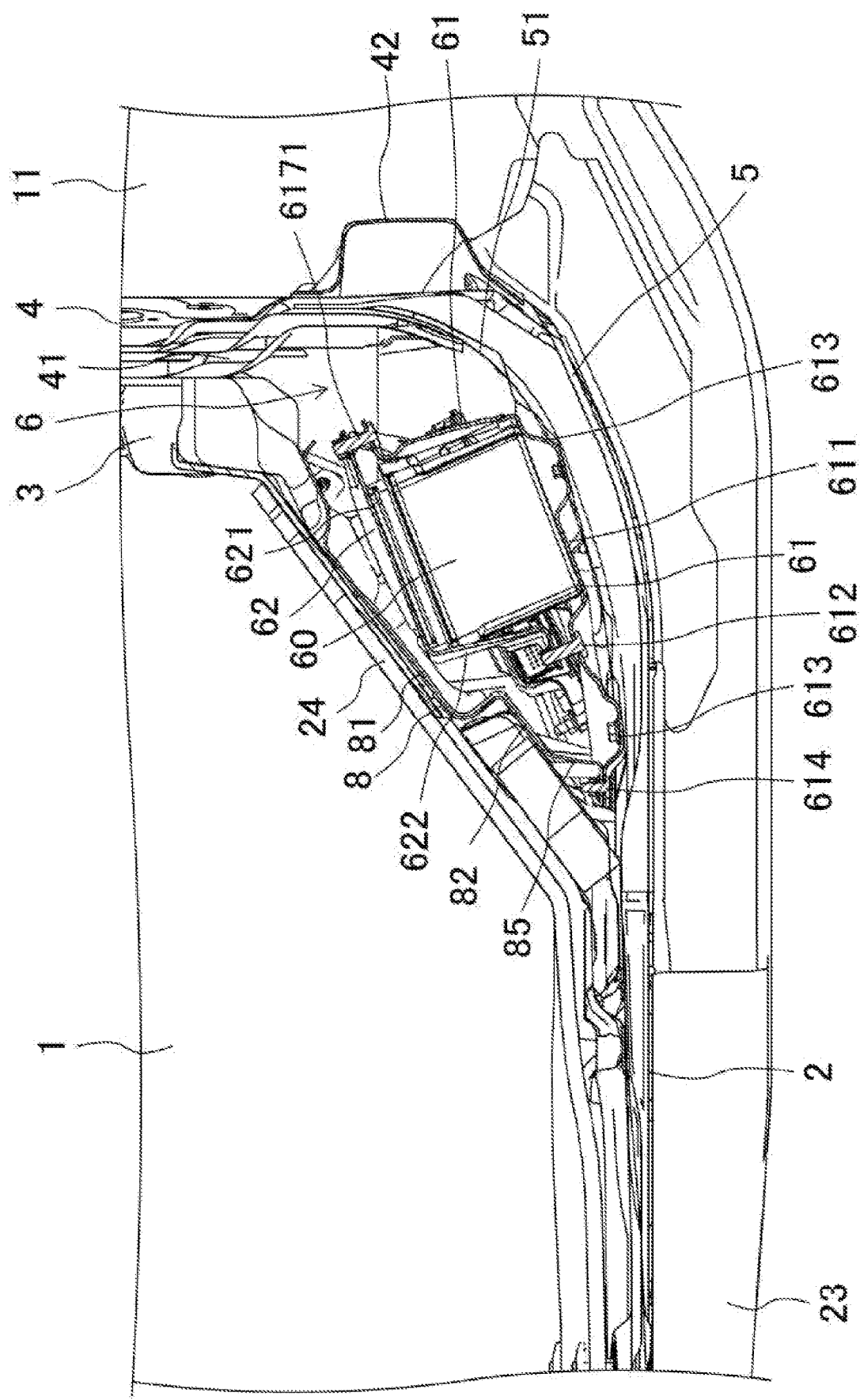
FIG. 2 is a sectional view taken along line II-II in FIG. 1.
Figure 3:
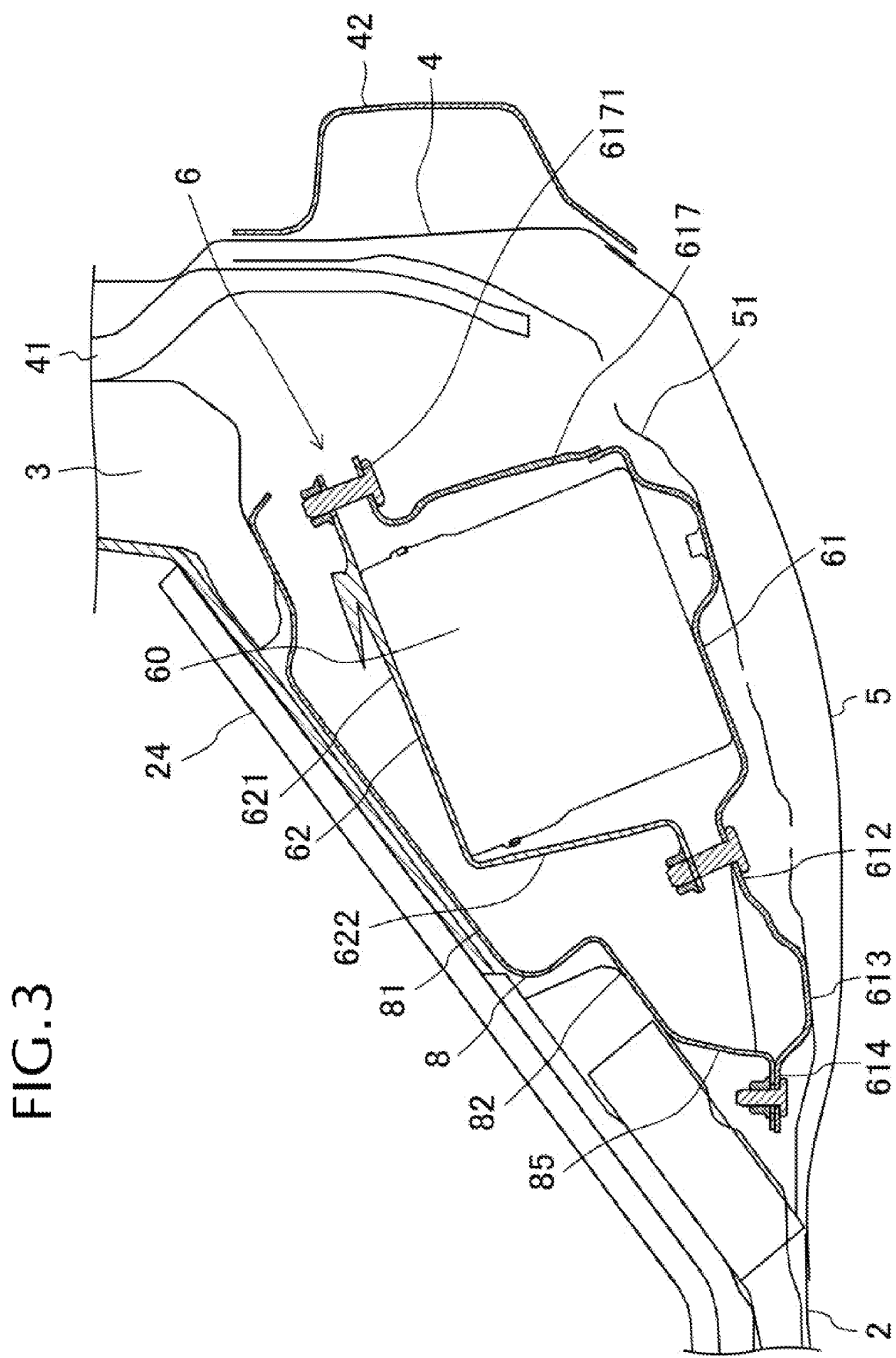
FIG. 3 is a schematic diagram of a main portion in FIG. 2.

The structure in front of the legroom for the occupant is illustrated in FIGS. 2 and 3. As illustrated in FIGS. 2 and 3, the vehicle interior 1 is separated from an engine compartment 11 by a dash panel vertical wall portion 4. A dash insulator 41 is provided between this dash panel vertical wall portion 4 and the instrument panel 3 to prevent noise generated in the engine compartment 11 or the like from being transmitted to the instrument panel 3. The dash insulator 41 is made of, for example, felt, non-woven fabric, or the like.

On the vehicle front side (the right side in the drawing) of the dash panel vertical wall portion 4, a dash reinforcement 42 that has a hat-shaped cross section and opens toward the dash panel vertical wall portion 4 side is provided. The dash reinforcement 42 is provided so as to extend in the vehicle width direction.

Figure 4:
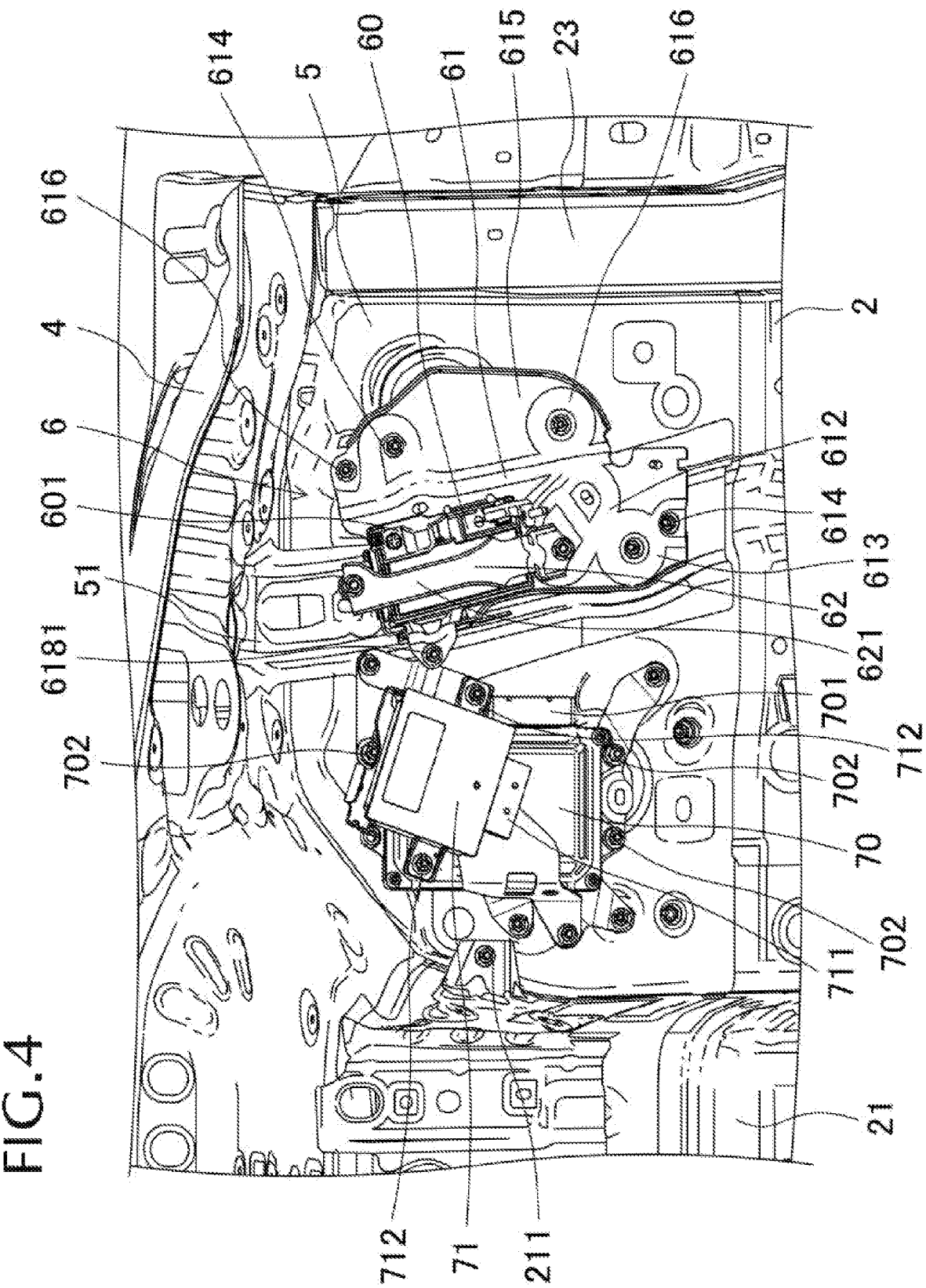
FIG. 4 is a top view of a corner portion in which a floor mat and a cover member are not illustrated.
Figure 5:
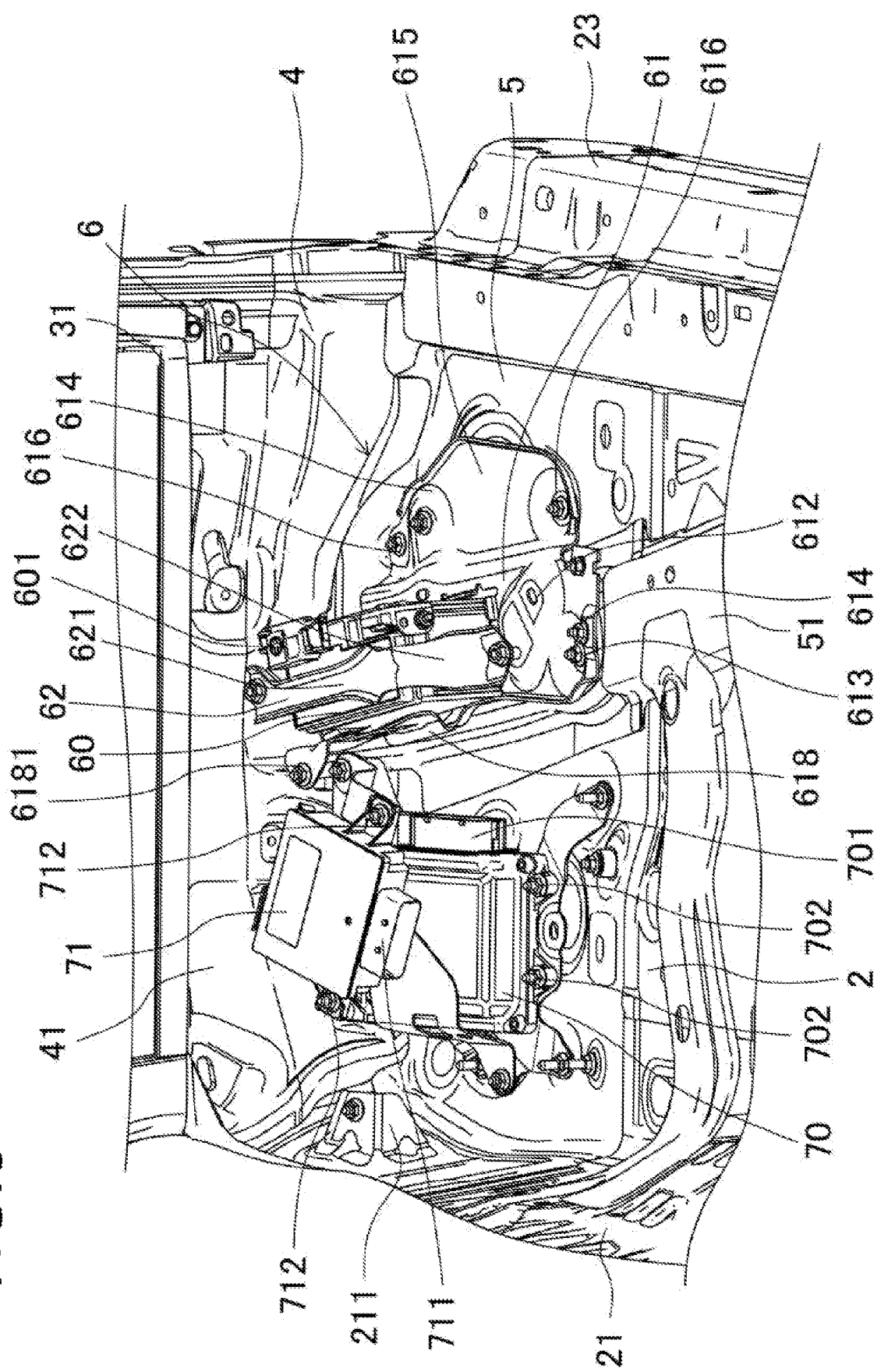
FIG. 5 is a perspective view of FIG. 4 as seen from the rear.
Figure 6:
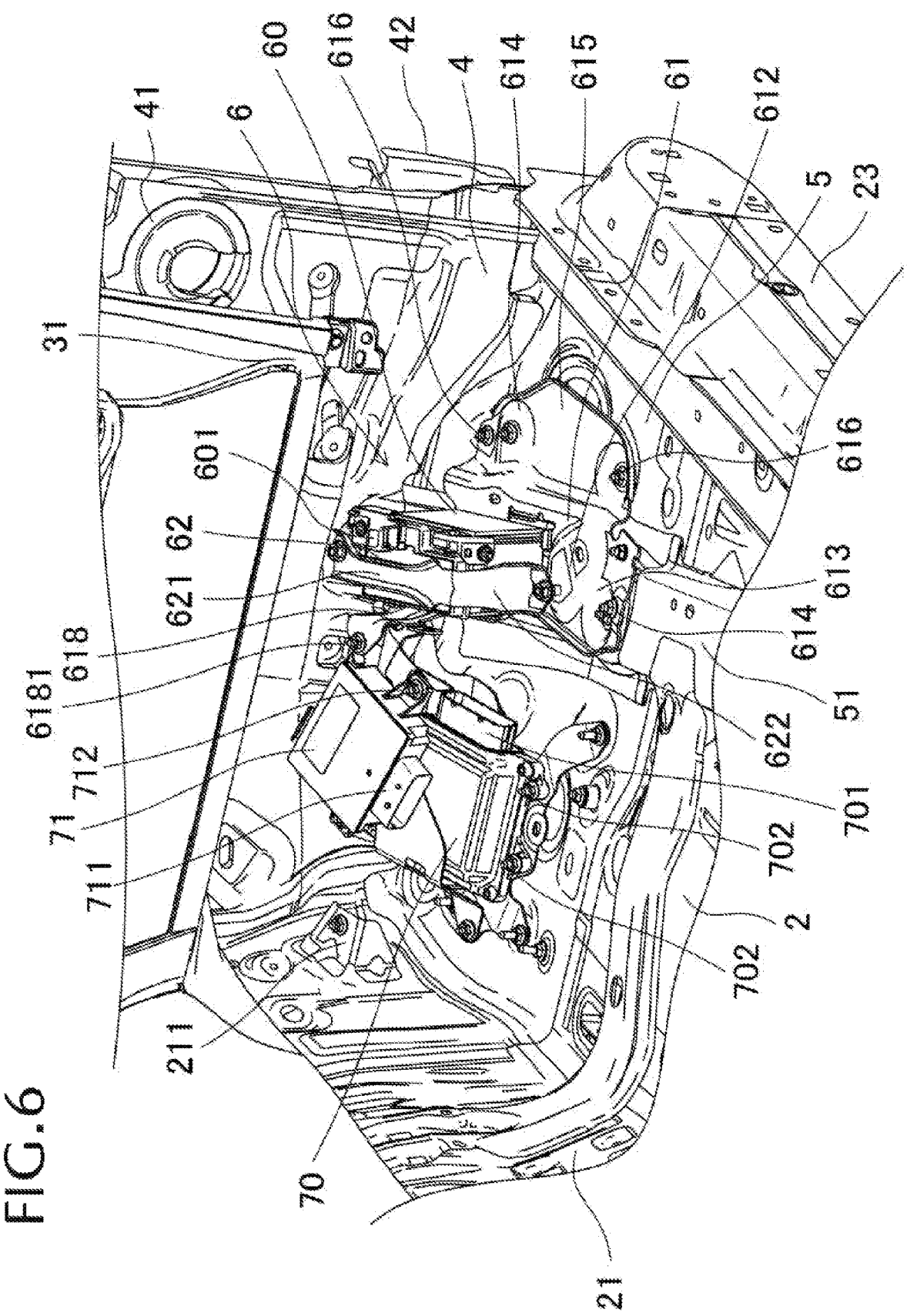
FIG. 6 is a perspective view of FIG. 4 as seen from the oblique upper right.

As illustrated in FIGS. 2 and 3, the lower end of the dash panel vertical wall portion 4 and the front end of the floor panel 2 are connected to each other by a corner panel that forms a curved corner portion 5 that spreads in the vehicle width direction. A floor reinforcement 51 that extends in the longitudinal direction while curving along this corner portion 5 is provided on the upper surface of the corner portion 5. The floor reinforcement 51 is formed to have a hat-shaped cross section that opens downward and, as illustrated in FIGS. 4 to 6, provided so as to be inclined toward the inner side in the vehicle width direction from the rear to the front. In addition, the front end of the floor reinforcement 51 is connected to the dash panel vertical wall portion 4.

Battery Unit Arrangement Structure for Vehicle

A main battery (not illustrated) with a large capacity is disposed in the engine compartment 11 of the vehicle according to the embodiment. In addition to this main battery, a sub battery 60 with a relatively low capacity is disposed in the corner portion 5, as illustrated in FIGS. 2 to 6. In addition, in the corner portion 5, a powertrain control module 70 (referred to below as a PCM 70) and a battery power supply 71 (referred to below as a BPS 71) are disposed adjacent to the inner side in the vehicle width direction of the battery unit 6, as illustrated in FIGS. 4 to 6. The sub battery 60, the PCM 70, and the BPS 71 are covered from above with the cover member 8, as illustrated in FIGS. 2 and 3.

As described above, the sub battery 60, the PCM 70, and the BPS 71 are efficiently disposed together using the space of the corner portion 5 that is large in the vehicle width direction. This can make the electric connections to the sub battery 60, the PCM 70, and the BPS 71 compact.

Structure of Battery Unit

As illustrated in FIGS. 2 and 3, the battery unit 6 is the unit of the sub battery 60. The battery unit 6 includes the sub battery 60, a battery mounting bracket 61 on which the sub battery 60 is placed, and a battery clamp 62 that holds the sub battery 60 on the battery mounting bracket 61.

The sub battery 60 is a rectangular parallelepiped component having vertical and longitudinal dimensions larger than the dimension in the vehicle width direction. As illustrated in FIG. 4 and the like, a harness connection portion 601 is provided on the upper surface of this sub battery 60.

Figure 7:
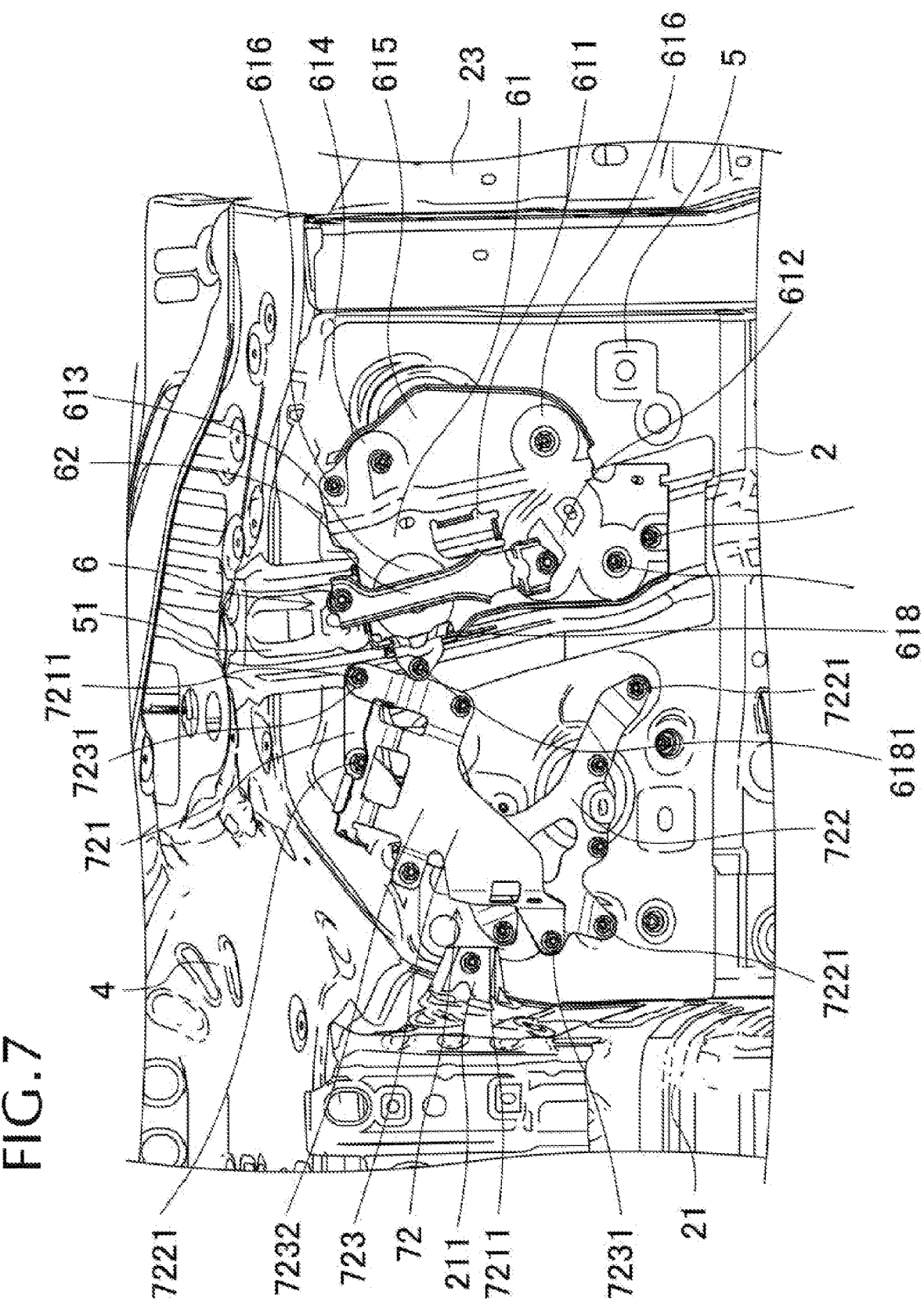
FIG. 7 is a diagram equivalent to FIG. 4 in which a sub battery, a BPS, and a PCM are not illustrated.

As illustrated in FIGS. 2, 3, and 7, the battery mounting bracket 61 has a placement surface 611 on which the sub battery 60 is placed. The placement surface 611 is disposed along the floor reinforcement 51. In addition, a rear portion 612 that extends backward along the floor reinforcement 51 is provided behind the placement surface 611. Each of the placement surface 611 and the rear portion 612 has a floor reinforcement fixing portion 613 recessed downward. The floor reinforcement fixing portions 613 are fastened to the floor reinforcement 51 with mounting bolts. In addition, a cover member fixing portion 614 that fixes the cover member 8 is provided adjacent to the floor reinforcement fixing portion 613 provided in the rear portion 612. The cover member fixing portion 614 is formed to project upward.

As illustrated in FIGS. 4 to 7, the outer sides in the vehicle width direction of the placement surface 611 and the rear portion 612 are bent downward, and the lower ends thereof are provided with a bracket outer portion 615 that extends to the outer side in the vehicle width direction along the corner portion 5. The front side and the rear side of the bracket outer side portion 615 are provided with fixing portions 616 recessed downward. These fixing portions 616 are fastened to the corner portions 5 with mounting bolts. The cover member fixing portion 614 that fixes the cover member 8 is provided adjacent to the rear side of the fixing portion 616 on the front side provided in the bracket outer side portion 615. The cover member fixing portion 614 is formed to project upward.

As illustrated in FIGS. 2 and 3, a front rise portion 617 that rises is provided in the front end portion of the placement surface 611. A front fastening portion 6171 that extends to the vehicle front is provided at the upper end of this front rise portion 617.

As illustrated in FIGS. 4 to 7, an inner rise portion 618 that rises is provided in the end portions on the inner side in the vehicle width direction of the placement surface 611 and the rear portion 612. An upper fastening portion 6181 that extends to the inner side in the vehicle width direction is provided at the upper end of this inner rise portion 618.

As illustrated in FIGS. 2 to 6, the battery clamp 62 passes over the sub battery 60 placed on the placement surface 611 of the battery mounting bracket 61. The battery clamp 62 includes a contact portion 621 in contact with the upper surface of the sub battery 60 and a bent portion 622 bent downward from the rear end of the contact portion 621. The lower end of this bent portion 622 is bent toward the vehicle rear.

The front end of the contact portion 621 of the battery clamp 62 extends to a portion above the front rise portion 617 of the battery mounting bracket 61 and is fastened to a front fastening portion 6171 of the front rise portion 617 with a mounting bolt. In addition, the lower end of the bent portion 622 of the battery clamp 62 is fastened to the rear portion 612 of the battery mounting bracket 61 with a mounting bolt. As described above, the sub battery 60 is supported by the battery mounting bracket 61 by fastening the front end and the rear end of the battery clamp 62 to the battery mounting bracket 61.

The sub battery 60 supported as described above is mounted to the corner portion 5 via the battery mounting bracket 61. The sub battery 60 is mounted so as to be inclined downward toward the vehicle rear with the rear end of the upper surface thereof located below the front end of the upper surface thereof by using the curved shape of the corner portion 5. Therefore, the sub battery 60 can be disposed closer to the dash panel vertical wall portion 4. The legroom for the occupant of the passenger seat can be larger by disposing the sub battery 60 as described above.

Furthermore, as illustrated in FIGS. 2 and 3, since the upper surface of the sub battery 60 is inclined downward toward the vehicle rear, even when the sub battery 60 is disposed close to the dash panel vertical wall portion 4, a clearance can be obtained between the top of the sub battery 60 and the dash panel vertical wall portion 4. Accordingly, the dash panel vertical wall portion 4 can be prevented from making contact with the sub battery 60 when the dash panel vertical wall portion 4 moves to the rear side (left side in the drawing) due to the impact during a vehicle collision (front collision). This can mitigate the effects on the sub battery 60 at the time of a vehicle front collision.

Structures of PCM and BPS

As illustrated in FIGS. 4 to 6, the PCM 70 and the BPS 71 as in-vehicle devices are disposed on the inner side in the vehicle width direction of the sub battery 60 in the corner portion 5. The PCM 70 and the BPS 71 are mounted in the corner portion 5 via an in-vehicle device bracket 72 with the BPS 71 and the PCM 70 vertically overlapping with each other.

Each of the PCM 70 and BPS 71 is a rectangular parallelepiped component having vertical and horizontal dimensions larger than the thickness. In the PCM 70, the dimension in the longitudinal direction is larger than the dimension in the vehicle width direction. The BPS 71 has a substantially square shape as seen in the vertical direction.

Although not illustrated, the PCM 70 is configured by a microprocessor including a CPU, a memory, a counter timer group, an interface, and a path connecting them to each other. The PCM 70 is a device for controlling the operation of a vehicle, such as controlling the drive of an engine or a motor. A PCM side connection portion 701 for connecting the harness is provided on the outer side in the vehicle width direction of the PCM 70. In addition, a PCM fixing portion 702 for fixing the PCM 70 is provided on each of the front and rear sides of the PCM 70.

Although not illustrated, the BPS 71 has a step-up DC/DC converter, a plurality of relay circuits, and the like. The BPS 71 enables the supply of electric power from the sub battery 60 by switching between relay circuits when the main battery in the engine compartment 11 fails. In addition, the BPS 71 monitors the state of the sub battery 60. Therefore, when the sub battery 60 needs to be charged, the BPS 71 switches between relay circuits so as to charge the sub battery 60. A BPS side connection portion 711 for connecting the harness is provided behind the BPS 71. In addition, BPS fixing portions 712 for fixing the BPS 71 are provided on both sides in the vehicle width direction of the BPS 71.

As illustrated in FIG. 7, the in-vehicle device bracket 72 includes a first bracket 721, a second bracket 722, and a third bracket 723. The first bracket 721 is disposed so as to be inclined toward the outer side in the vehicle width direction from the rear (lower side in FIG. 7) to the front (upper side in FIG. 7). This first bracket 721 has a first bracket fixing portion 7211 on each of the inner side (left side in FIG. 7) in the vehicle width direction and on the outer side (right side in FIG. 7) in the vehicle width direction. The first bracket fixing portion 7211 on the inner side in the vehicle width direction is fastened to the corner portion 5 with a mounting bolt. The first bracket fixing portion 7211 on the outer side in the vehicle width direction is fastened to the floor reinforcement 51 with a mounting bolt.

The second bracket 722 is a substantially C-shaped member that opens to the outer side in the vehicle width direction as seen in the vertical direction. The second bracket 722 includes a second bracket fixing portion 7221 in each of the front end portion, the end portion on the inner side in the vehicle width direction, and the end portion on the outer side in the vehicle width direction. The second bracket fixing portion 7221 in the front end portion is fastened to the first bracket 721 with a mounting bolt. The second bracket fixing portions 7221 on the inner side in the vehicle width direction and on the outer side in the vehicle width direction are fastened to the corner portion 5 with a mounting bolts.

The third bracket has a BPS placement surface 7232 that spreads horizontally. The inner side in the vehicle width direction of this BPS placement surface 7232 is bent downward toward the inner side in the vehicle width direction and the lower end thereof is provided with a third bracket fixing portion 7231 that extends to the inner side in the vehicle width direction. In addition, the outer side in the vehicle width direction is bent toward the lower front of the vehicle and the lower end thereof is provided with the third bracket fixing portion 7231 that extends forward. The third bracket fixing portion 7231 on the inner side in the vehicle width direction is fastened to the second bracket 722 with a mounting bolt. In addition, the third bracket 723 on the outer side in the vehicle width direction overlaps with the first bracket fixing portion 7211 of the first bracket 721 and is fastened to the floor reinforcement 51 together with the first bracket fixing portion 7211 with a mounting bolt.

As illustrated in FIGS. 4 to 6, the PCM 70 is disposed between the second bracket 722 and the third bracket 723. The PCM 70 is fixed by fastening the PCM fixing portion 702 to the second bracket 722 with a mounting bolt. In addition, the BPS 71 is placed on the BPS placement surface 7232 of the third bracket 723. The BPS 71 is fixed by fastening the BPS fixing portion 712 to the third bracket 723 with a mounting bolt. As described above, the PCM 70 and BPS 71 are mounted to the corner portion 5 with the PCM 70 and BPS 71 vertically overlapping with each other.

Connection of Harnesses

Figure 8:
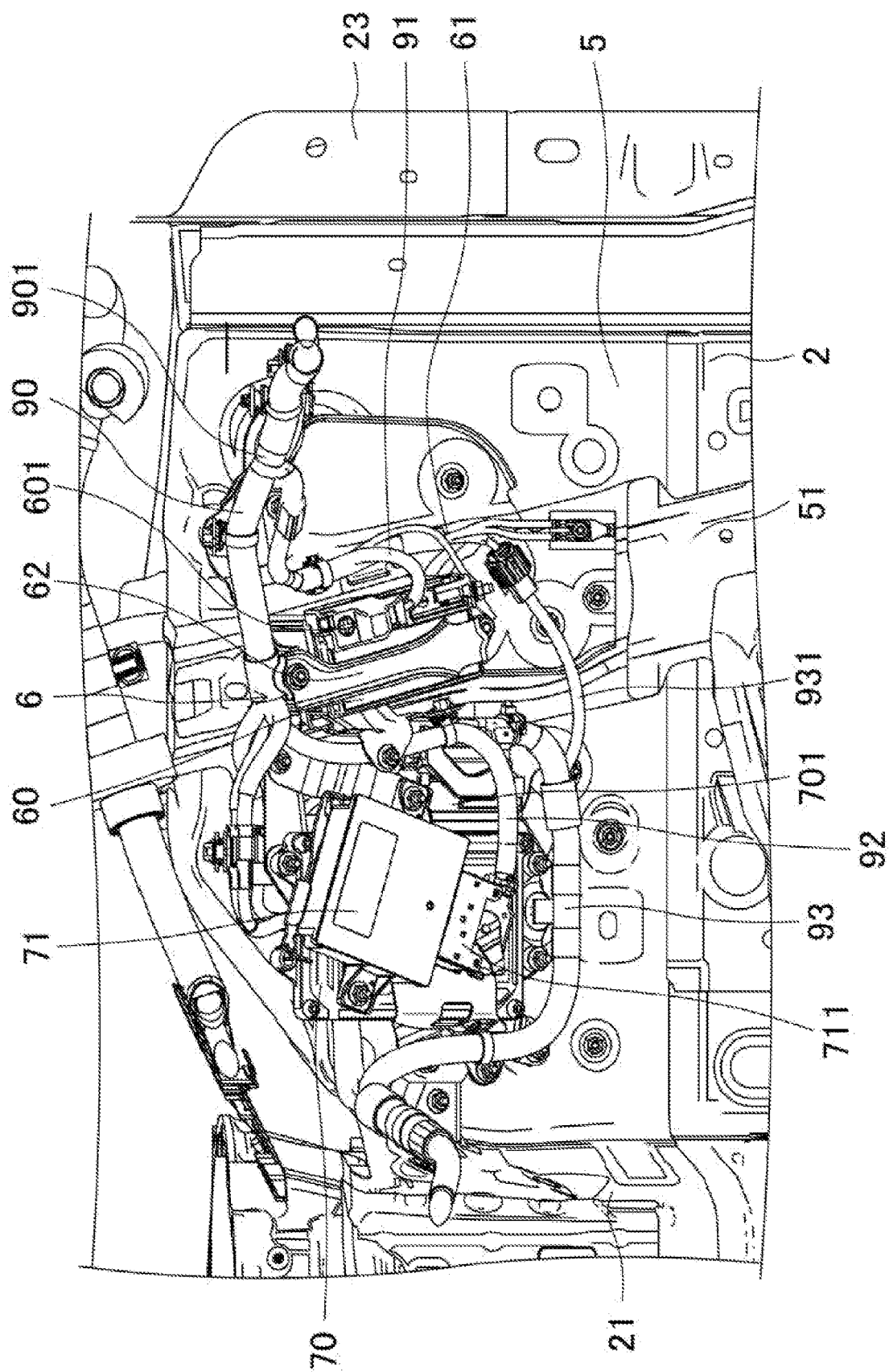
FIG. 8 is a diagram equivalent to FIG. 4, illustrating the wiring of harnesses.
Figure 9:
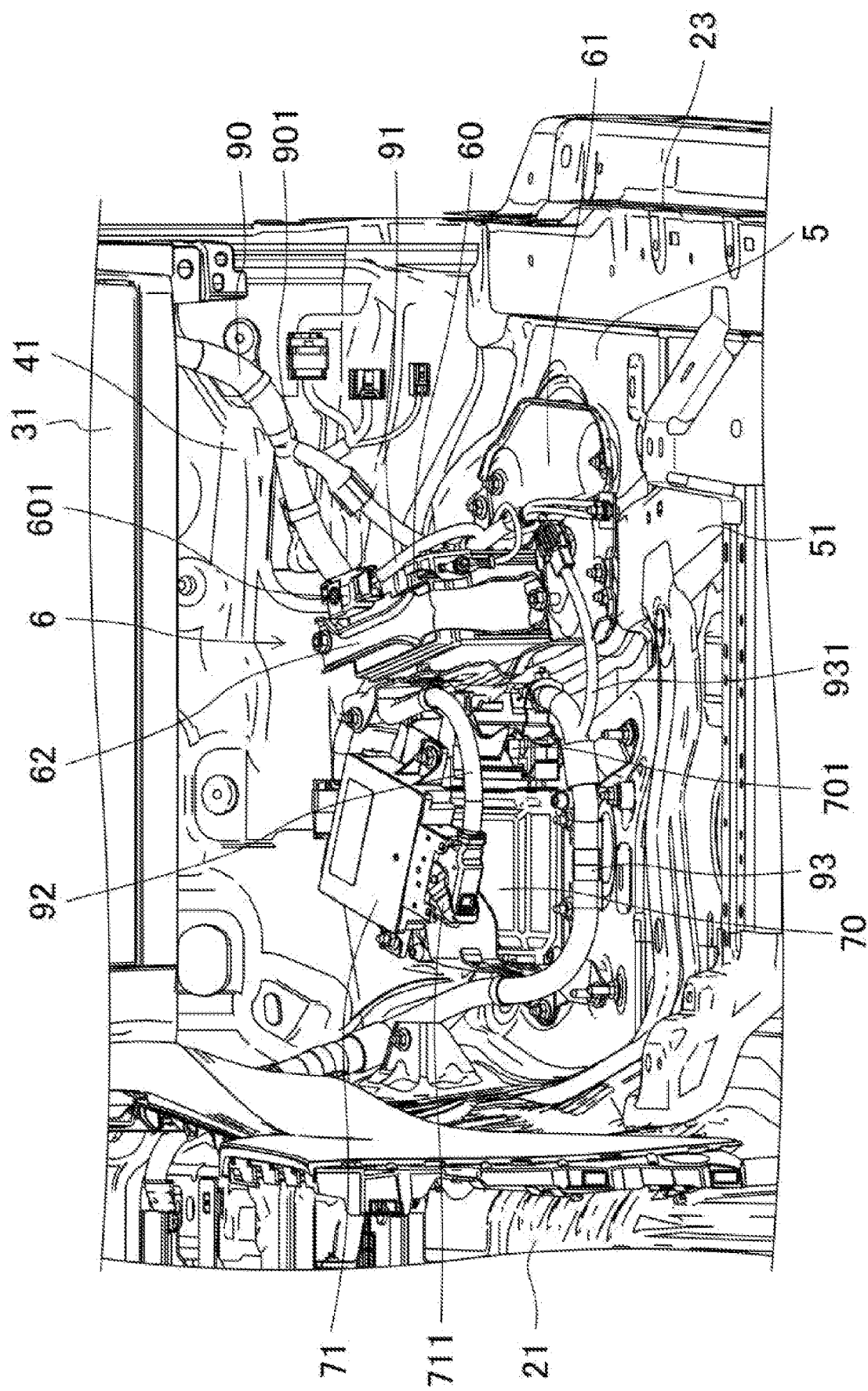
FIG. 9 is a diagram equivalent to FIG. 5, illustrating the wiring of the harnesses.
Figure 10:
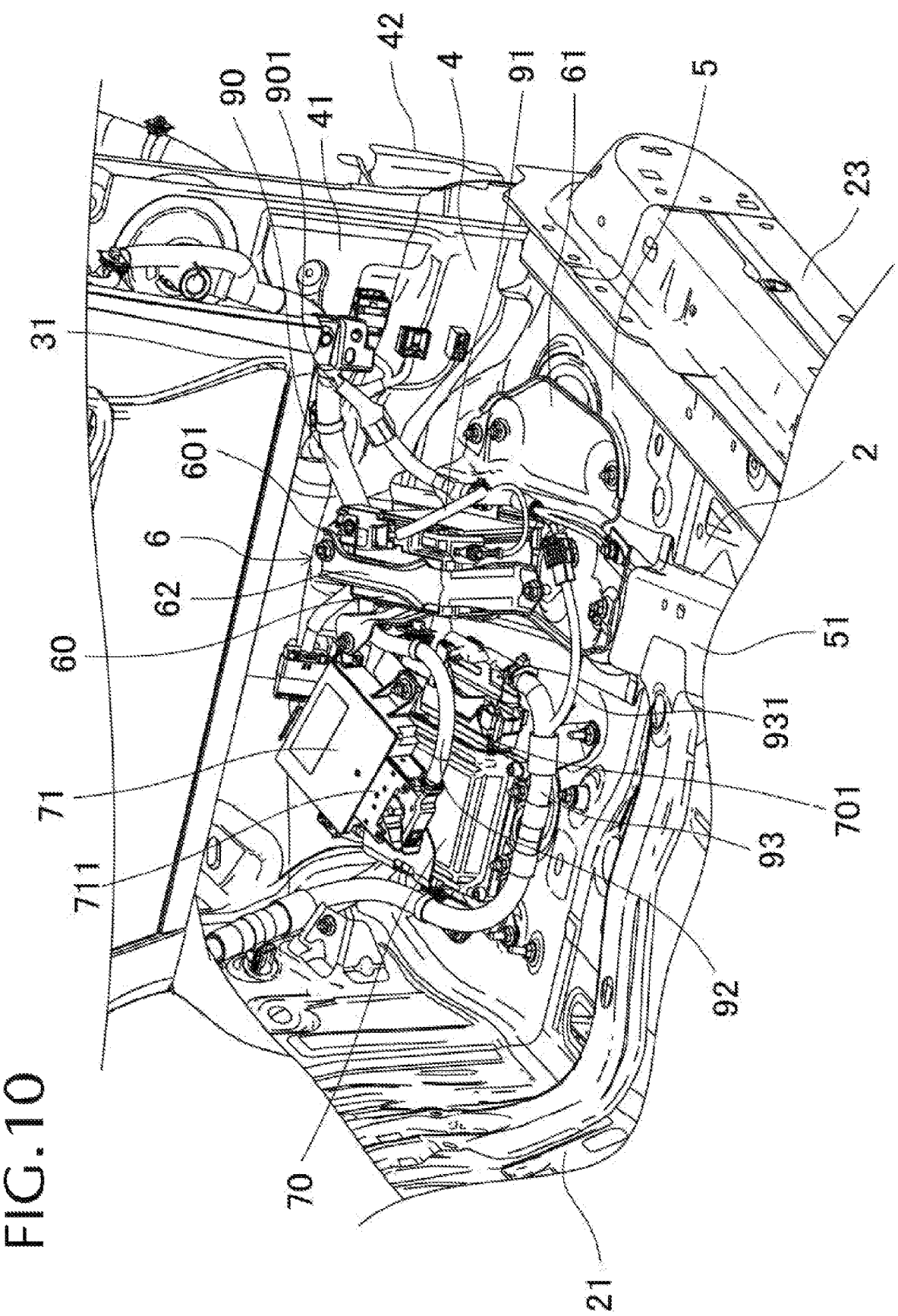
FIG. 10 is a diagram equivalent to FIG. 6, illustrating the wiring of the harnesses.

The wiring of harnesses connected to the sub battery 60, the PCM 70, and the BPS 71 will be described with reference to FIGS. 8 to 10.

A core harness 90 that extends in the vehicle width direction is disposed in front of the sub battery 60. A plurality of harnesses are inserted into this core harness 90. A power supply line connected to the main battery is also provided in the core harness 90. An intermediate branching portion 901 for branching and routing the harness is provided approximately in the middle of the core harness 90. Although not illustrated, the outer side in the vehicle width direction of the core harness 90 is connected to the main battery.

The battery side harness 91 connected to the harness connection portion 601 of the sub battery 60 merges into the intermediate branching portion 901 of the core harness 90 through the placement surface 611 of the battery mounting bracket 61. This battery side harness 91 is fixed to the placement surface 611 by the harness fixing member.

A BPS side harness 92 is connected to the BPS side connection portion 711 of the BPS 71. The BPS side harness 92 merges into the core harness 90 from the end portion on the inner side in the vehicle width direction of the core harness 90 through the inner side in the vehicle width direction of the inner rise portion 618 of the battery mounting bracket 61. This BPS side harness 92 is fixed to the inner rise portion 618 by the harness fixing member. The battery side harness 91 and the BPS side harness 92 are electrically connected to each other via the core harness 90. Accordingly, electric power can be supplied from the sub battery 60 to the BPS 71.

The PCM side harness 93 connected to the PCM side connection portion 701 of the PCM 70 is provided so as to extend to the inner side in the vehicle width direction through the rear of the PCM 70. This PCM side harness 93 has a PCM side branching harness 931 that branches halfway. The PCM side branching harness 931 merges into the intermediate branching portion 901 of the core harness 90 through the placement surface 611 of the battery mounting bracket 61. This PCM side branching harness 931 is fixed to the placement surface 611 by the harness fixing member together with the battery side harness 91 described above. This PCM side branching harness 931 and the BPS side harness 92 are electrically connected to each other via the core harness 90. Accordingly, electric power can be supplied from the sub battery 60 to the PCM 70 via the BPS 71 by switching between relay circuits of the BPS 71.

Cover Member

As illustrated in FIGS. 2 and 3 and FIGS. 11 to 13, the sub battery 60, the PCM 70, and the BPS 71 described above are covered with the cover member 8 from above. As illustrated in FIGS. 2 and 3, this cover member 8 is inclined downward toward the vehicle rear so that the rear end (left side in the drawing) of the upper surface thereof is lower than the front end (right side in the figure) of the upper surface thereof. The upper surface of the cover member 8 includes an upper surface front portion 81 on the front side and an upper surface rear portion 82 on the rear side, which is located below an upper surface front portion 81.

Figure 11:
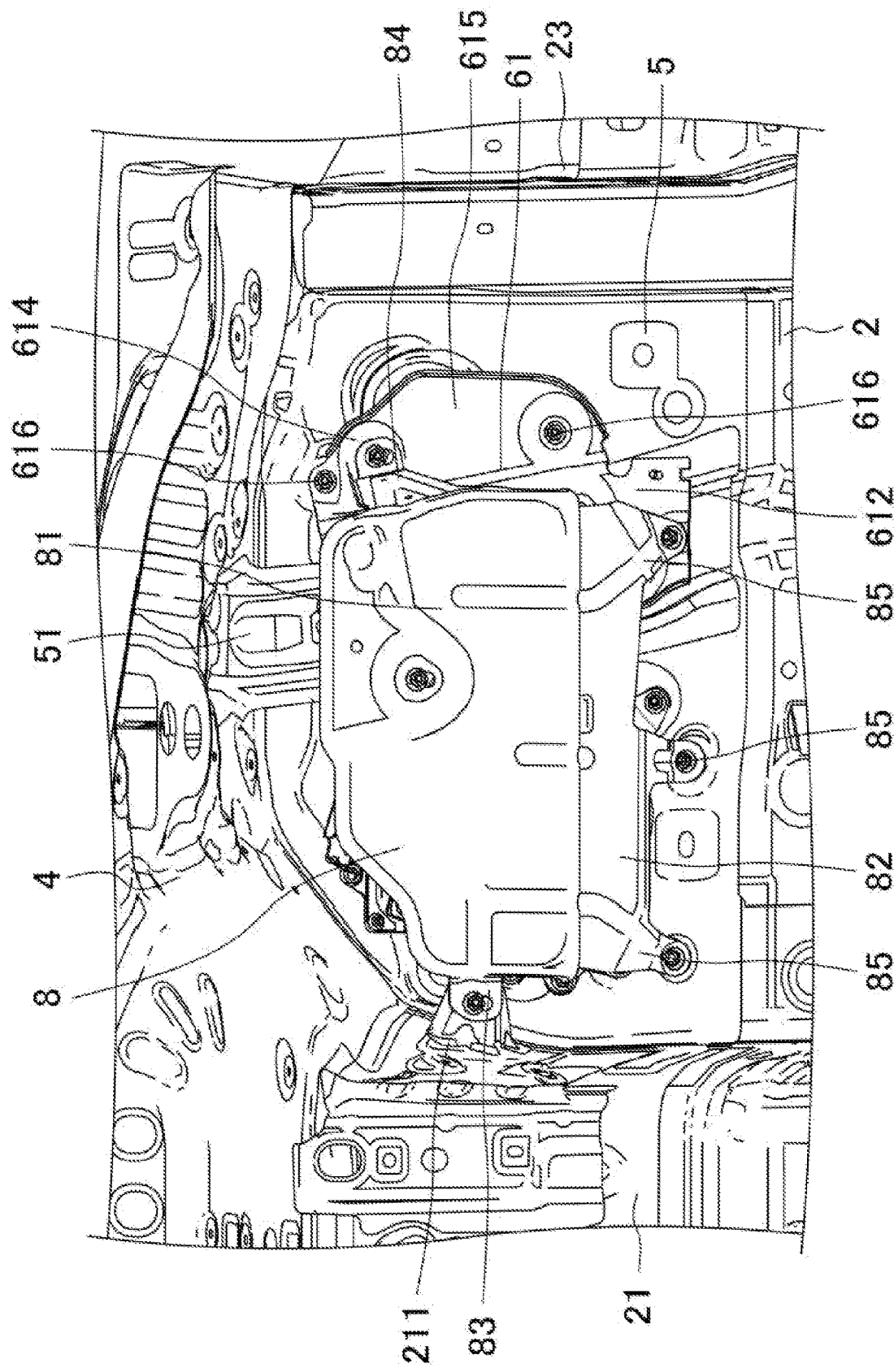
FIG. 11 is a top view of the corner portion in which the floor mat is not illustrated.
Figure 12:
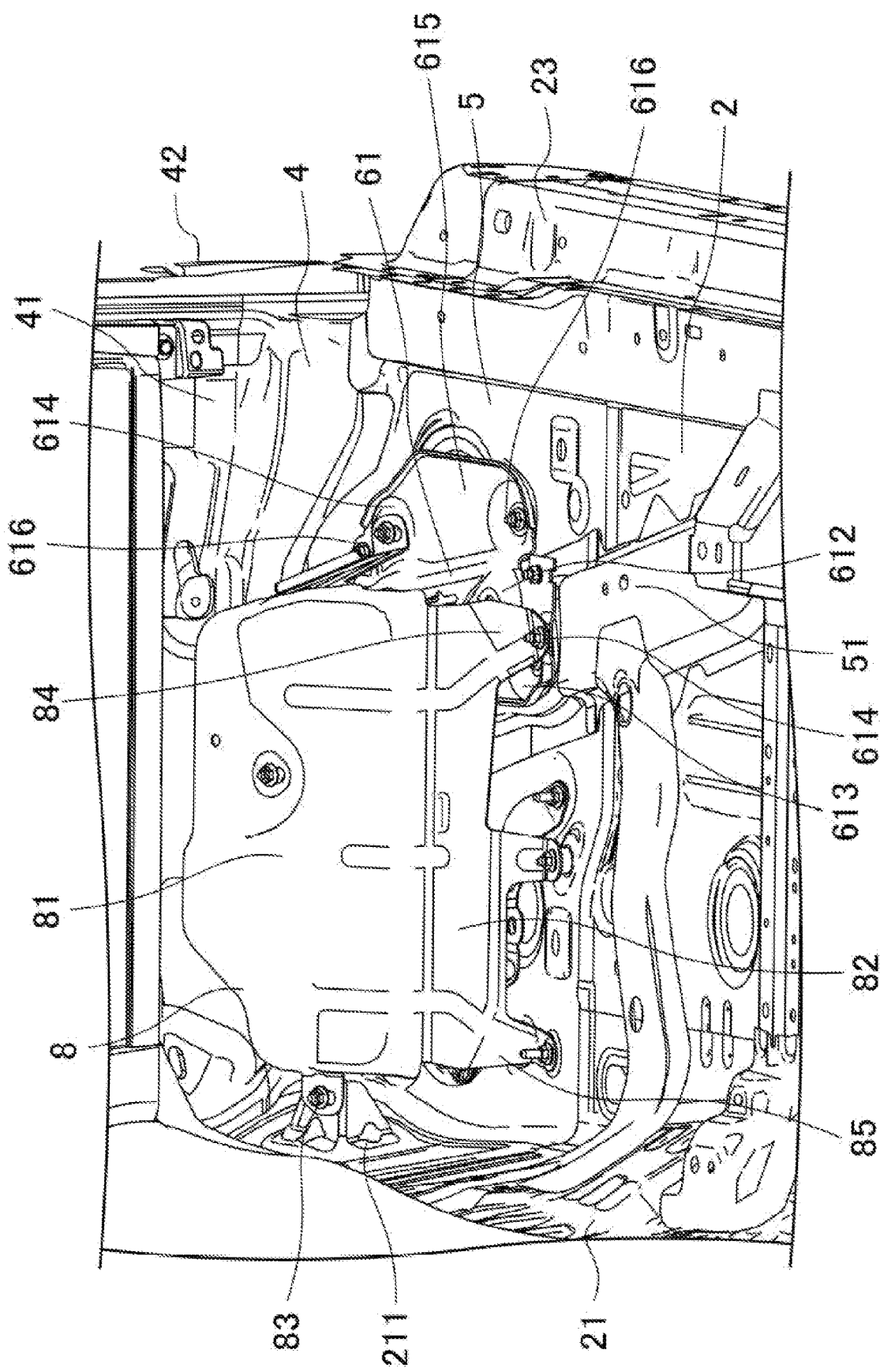
FIG. 12 is a perspective view of FIG. 11 as seen from the rear.
Figure 13:
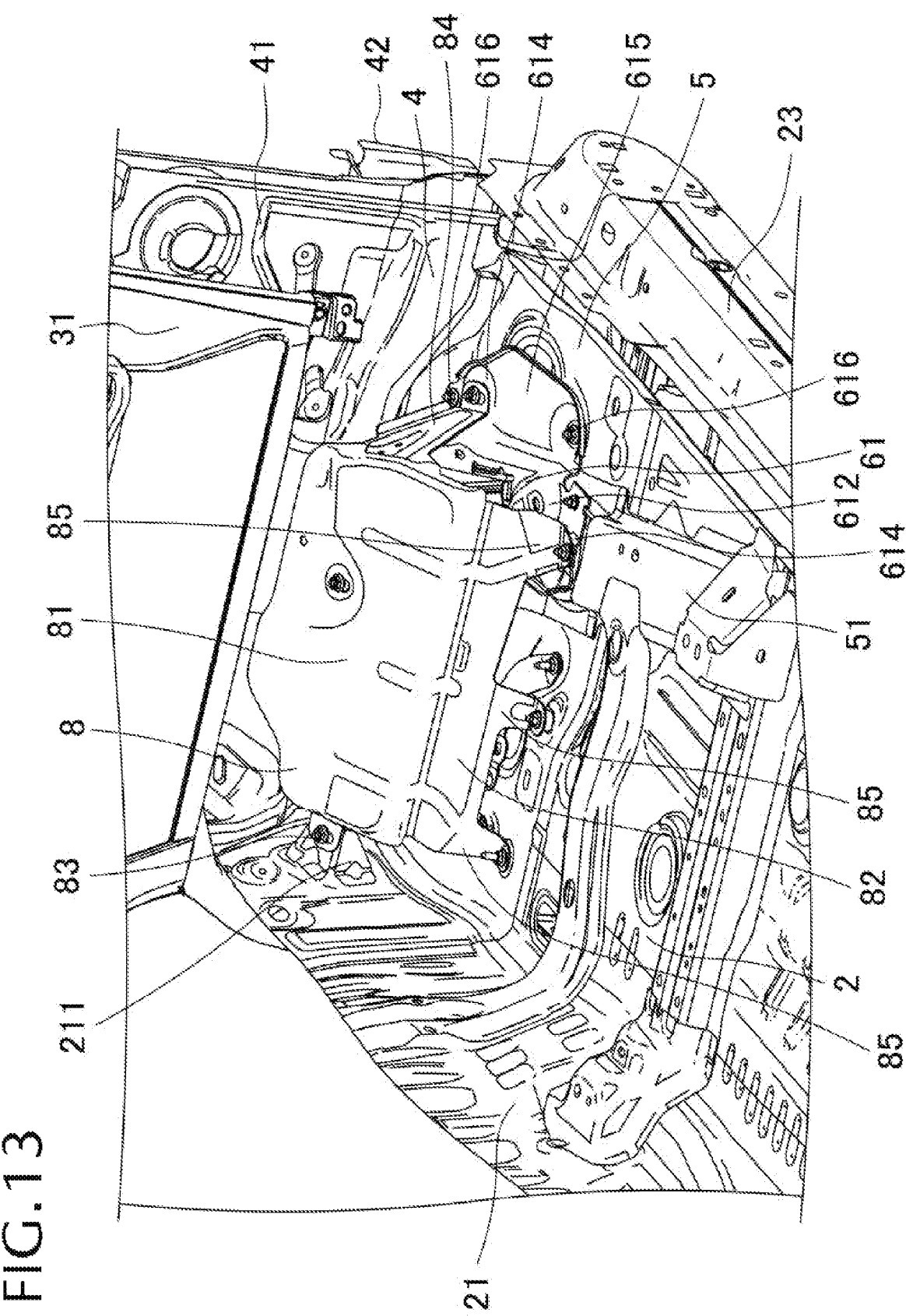
FIG. 13 is a perspective view of FIG. 11 as seen from the oblique upper right.

As illustrated in FIGS. 11 to 13, an inner cover fastening portion 83 that extends to the inner side in the vehicle width direction is provided in the inner end portion in the vehicle width direction of the upper surface front portion 81 of the cover member 8. This inner cover fastening portion 83 is fastened with a mounting bolt to a cover member fixing base 211 fixed to the tunnel portion 21. The approximately central portion of the upper surface front portion 81 of the cover member 8 is fastened with a mounting bolt to the upper fastening portion 6181 provided in the inner rise portion 618 of the battery mounting bracket 61. A cover outer side fastening portion 84 that extends downward is provided on the outer side in the vehicle width direction of the upper surface front portion 81 of the cover member 8. The lower end of this cover outer side fastening portion 84 is fastened with a mounting bolt to the cover member fixing portion 614 provided in the bracket outer side portion 615.

At the rear end of the upper surface rear portion 82 of the cover member 8, rear side cover member fastening portions 85 bent downward are provided at three locations at intervals in the vehicle width direction. Of these rear side cover fastening portions 85, those provided on the inner side and in the middle in the vehicle width direction are fastened to the corner portion 5 with mounting bolts. In addition, the rear side cover member fastening portion 85 provided on the outer side in the vehicle width direction is fastened with a mounting bolt to the cover member fixing portion 614 provided in the rear portion 612 of the battery mounting bracket 61.

The cover member fixing portion 614 provided in the battery mounting bracket 61 to fix this cover member 8 is adjacent to the fixing portion 616 for fixing the battery mounting bracket 61 to the corner portion or the floor reinforcement 51 or the floor reinforcement fixing portion 613. This improves the support rigidity for the cover member 8.

As illustrated in FIGS. 2 and 3, the floor mat 24 is provided along the inclination of the cover member 8 on the upper surface of this cover member 8. Accordingly, the occupant of the passenger seat can use the floor mat 24 as a foothold. Accordingly, it is possible to obtain the legroom for the occupant of the passenger seat and reduce the oppressive feeling of the occupant sitting on the passenger seat.

In addition, when the support rigidity for the cover member 8 is low, the occupant of the passenger seat may have an uncomfortable feeling when putting his legs on the floor mat 24 on the cover member 8. The uncomfortable feeling of the occupant of the passenger seat can be reduced by improving the support rigidity for the cover member 8 as described above.

What is claimed is:

1. A battery unit arrangement structure for a vehicle, comprising:
   a dash panel vertical wall portion that separates a vehicle interior from an engine compartment;
   a floor panel that forms a floor surface of the vehicle interior; and
   a curved corner portion that connects a lower end of the dash panel vertical wall portion and a front end of the floor panel to each other, the corner portion having a floor reinforcement on an upper surface thereof, the floor reinforcement extending in a vehicle longitudinal direction while curving along the corner portion, having a hat-shaped cross-section that opens downward, and having a front end connected to the dash panel vertical wall portion,
   wherein a battery unit is mounted to the floor reinforcement of the corner portion in front of a passenger seat with an upper surface of the battery unit inclined downward toward a vehicle rear so that a rear end of the battery unit is lower than a front end of the battery unit, and
   the battery unit is covered, from above, with a cover member that is inclined downward toward the vehicle rear so that a rear end of the cover member is lower than a front end of the cover member.

2. The battery unit arrangement structure for a vehicle according to claim 1,
   wherein there is a clearance between the battery unit and the dash panel vertical wall portion.

3. The battery unit arrangement structure for a vehicle according to claim 1,
   wherein the battery unit includes a mounting bracket fixed to the corner portion, a battery placed on the mounting bracket, and a battery clamp that passes over the battery and is fastened to a fastening portion of the mounting bracket, the fastening portion extending to an outer side from the battery, and
   the mounting bracket has a cover member fixing portion that fixes an edge of the cover member.

4. The battery unit arrangement structure for a vehicle according to claim 2,
   wherein the battery unit includes a mounting bracket fixed to the corner portion, a battery placed on the mounting bracket, and a battery clamp that passes over the battery and is fastened to a fastening portion of the mounting bracket, the fastening portion extending to an outer side from the battery, and
   the mounting bracket has a cover member fixing portion that fixes an edge of the cover member.

5. The battery unit arrangement structure for a vehicle according to claim 3,
   wherein the cover member fixing portion is disposed adjacent to a fixing portion through which the mounting bracket is fixed to the corner portion.

6. The battery unit arrangement structure for a vehicle according to claim 4,
   wherein the cover member fixing portion is disposed adjacent to a fixing portion through which the mounting bracket is fixed to the corner portion.

7. The battery unit arrangement structure for a vehicle according to claim 3,
   wherein an in-vehicle device to which electric power is supplied from the battery unit is provided adjacent in a vehicle width direction to the battery unit, and
   the battery unit and the in-vehicle device are covered with the cover member from above.

8. The battery unit arrangement structure for a vehicle according to claim 4,
   wherein an in-vehicle device to which electric power is supplied from the battery unit is provided adjacent in a vehicle width direction to the battery unit, and
   the battery unit and the in-vehicle device are covered with the cover member from above.

9. The battery unit arrangement structure for a vehicle according to claim 5,
   wherein an in-vehicle device to which electric power is supplied from the battery unit is provided adjacent in a vehicle width direction to the battery unit, and
   the battery unit and the in-vehicle device are covered with the cover member from above.

10. The battery unit arrangement structure for a vehicle according to claim 6,
    wherein an in-vehicle device to which electric power is supplied from the battery unit is provided adjacent in a vehicle width direction to the battery unit, and
    the battery unit and the in-vehicle device are covered with the cover member from above.

11. The battery unit arrangement structure for a vehicle according to claim 1,
    a main battery is disposed in the engine compartment, and
    the battery unit is a unit of a sub battery having a smaller capacity than the main battery.

12. The battery unit arrangement structure for a vehicle according to claim 2,
    a main battery is disposed in the engine compartment, and
    the battery unit is a unit of a sub battery having a smaller capacity than the main battery.

13. The battery unit arrangement structure for a vehicle according claim 3,
    a main battery is disposed in the engine compartment, and
    the battery unit is a unit of a sub battery having a smaller capacity than the main battery.

14. The battery unit arrangement structure for a vehicle according to claim 4,
    a main battery is disposed in the engine compartment, and
    the battery unit is a unit of a sub battery having a smaller capacity than the main battery.

15. The battery unit arrangement structure for a vehicle according to claim 5,
    a main battery is disposed in the engine compartment, and
    the battery unit is a unit of a sub battery having a smaller capacity than the main battery.

16. The battery unit arrangement structure for a vehicle according to claim 6,
    a main battery is disposed in the engine compartment, and
    the battery unit is a unit of a sub battery having a smaller capacity than the main battery.

17. The battery unit arrangement structure for a vehicle according to claim 7,
    a main battery is disposed in the engine compartment, and
    the battery unit is a unit of a sub battery having a smaller capacity than the main battery.

18. The battery unit arrangement structure for a vehicle according to claim 8,
    a main battery is disposed in the engine compartment, and
    the battery unit is a unit of a sub battery having a smaller capacity than the main battery.

19. The battery unit arrangement structure for a vehicle according to claim 9,
    a main battery is disposed in the engine compartment, and
    the battery unit is a unit of a sub battery having a smaller capacity than the main battery.

20. The battery unit arrangement structure for a vehicle according to claim 10,
   a main battery is disposed in the engine compartment, and
   the battery unit is a unit of a sub battery having a smaller capacity than the main battery.

* * * * *